Feb. 24, 1959  O. V. CARDINAL  2,874,616
RADIUS AND CHAMFER CUTTER ASSEMBLY
Filed Feb. 15, 1954

INVENTOR.
OLIVER VETAL CARDINAL
BY
ATTORNEYS

2,874,616
RADIUS AND CHAMFER CUTTER ASSEMBLY

Oliver Vetal Cardinal, Detroit, Mich.

Application February 15, 1954, Serial No. 410,200

3 Claims. (Cl. 90—12)

This invention relates to a radius and chamfer cutter and is a continuation in part of my co-pending application, Serial No. 312,056, filed September 29, 1952, and now abandoned.

One object of this invention is to provide a radius and chamfer cutter including a cutter element carried by a shaft for rotation therewith, and having a pair of rotatable guides on the shaft at opposite ends of the cutter element for engaging the sides of a work piece adjacent to a corner thereof while the cutter is employed to form a radius on the work piece.

Another object of the invention is to provide a radius and chamfer cutter having means for protecting the cutter element when the cutter is not in use.

In accordance with the present invention, one of the rotatable guides is shiftable axially of the shaft between first and second limiting positions respectively overlying and exposing the cutter element. The shiftable guide is automatically shifted to a position exposing the cutter element when the cutter is applied to the corner of a work piece, and resilient means are provided for normally urging the shiftable guide to a position overlying and protecting the cutter element when the cutter is not in use.

Still another object of the invention is to provide a radius and chamfer cutter in which stops are provided for determining the first and second limiting positions of the shiftable guide, the stop for limiting movement of the guide in a direction to expose the cutter element being adjustable in order to vary the portion of the cutter element which may be exposed.

A further object of the invention is to provide a cutter of the class described which is composed of a relatively few simple parts, which may be easily manufactured, assembled and disassembled, and which is comparatively easy to operate.

Other objects of the invention will become apparent as the description proceeds, especially when taken in conjunction with the accompanying drawing wherein.

Figure 1:
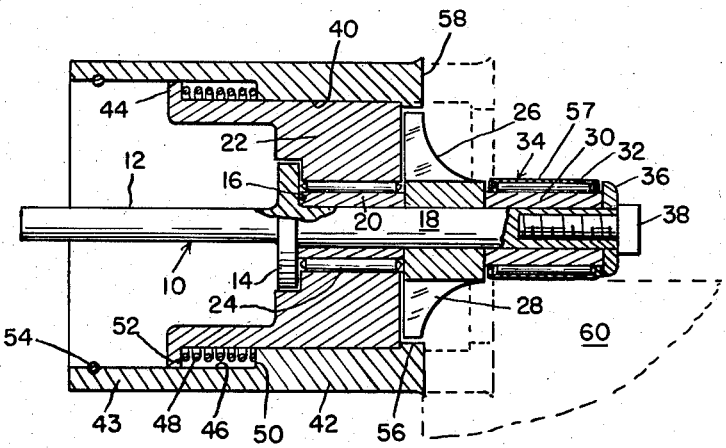
Figure 1 is a longitudinal sectional view of a cutter constructed in accordance with the present invention, the cutter being shown in solid lines in operative relationship to a work piece, the dotted line position showing the tool when not in use.
Figure 2:
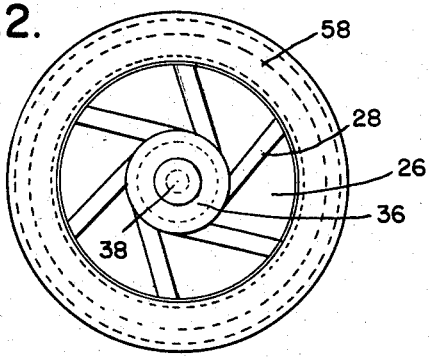
Figure 2 is a end elevational view of the cutter assembly shown in Figure 1.

Referring now more particularly to the drawing and especially to Figures 1 and 2 thereof, the cutter assembly there illustrated is intended primarily as a hand tool and includes a shaft 10 having a slightly reduced inner end portion 12 adapted to be received in the chuck of a suitable hand tool. The shaft has a radially extending flange 14 which is shaped to provide an abutment shoulder 16 for a purpose described below.

The shaft 10 is somewhat enlarged outwardly of the flange 14 as indicated at 18 and assembled on the enlarged outer portion 18 of the shaft and in abutting relation with the shoulder 16 of flange 14 is the inner race 20 of an inner bearing which includes an outer race 22 and needle bearings 24.

A cutter element 26 is mounted on the enlarged portion 18 of the shaft outwardly of the inner bearing, and the cutter element includes cutting blades 28 which are concavely shaped to form a radius on a work piece. It will be understood, of course, that various other cutter shapes may be provided to form modified corner portions on a work piece and, in fact, a somewhat different form is illustrated in the construction shown in Figure 3 which is described more fully hereinafter.

Outwardly of the cutter 26 is an outer bearing which includes the inner race 30, needle bearings 32 and the outer race 34. Located outwardly of the outer bearing is an annular cap member 36 which fits over the outer end of the shaft and extends therebeyond to a diameter slightly less than that of the race 34. The cap member 36 is releasably secured upon the shaft by a bolt 38 which is threaded in an axial opening at the outer end of the shaft.

It will be seen that the inner race 20 of the inner bearing is held in abutting relation between the shoulder 16 and the inner end of the cutter, and that the outer end of the cutter abuts the inner end of the inner race 30 of the outer bearing. The outer end of the inner race 30 abuts against the cap member 36 so that the assembly consisting of the inner races 20 and 30 and the cutter 26 is firmly locked and held against rotation on the shaft 10 by the pressure between cap member 36 and the shoulder 16 when the cap member is firmly clamped to the end of the shaft.

It will be noted that the outer race 22 of the inner bearing is free of contact with the radially extending flange 14 and the cutter 26, and that the outer race 34 of the outer bearing is somewhat shorter than the inner race thereof and thus is out of contact with the cutter and cap member. Accordingly, the outer race of each bearing is free to rotate independently of the shaft.

The outer surface 40 of the outer race 22 is cylindrical and slidably receives the cylindrical shell 42. The inner end portion 43 of shell 42 is of reduced thickness and the outer race 22 is formed with a radially outwardly extending flange 44 to form a chamber 46 between outer race 22 and shell 42. A coil spring 48 is disposed within space 46 having its opposite ends respectively compressed between the shoulder 50 of shell 42 and the shoulder 52 of flange 44. Spring 48 normally urges the shell 42 outwardly to the limiting position shown in dotted lines in Figure 1 as determined by the stop 54. Stop 54 is in the form of a circular retaining ring and is preferably a split ring received in an annular recess in the inner surface of the shell 42 adjacent the inner end thereof. Shell 42 is, of course, of greater diameter than the cutter element so that in the dotted line position of the shell, the same completely overlies cutter 26. The shell may be retracted against the action of spring 48 to the solid line position shown in Figure 1, this retracted position being determined by the engagement of the radially inwardly extending flange 56 at the outer end of the shell with the outer race 22.

It will be seen that the outer surface 57 of the outer race 34 is concentric with the shaft axis, and that the end surface 58 of shell 42 is normal to the shaft axis. The surfaces 57 and 58 constitute guiding surfaces for the cutter assembly and respectively engage the surfaces of a work piece adjacent to the corner being operated upon. As seen in Figure 1, these surfaces 57 and 58 are in substantial continuation of the cutter blades when the shell is retracted to full line position.

It will now be apparent that the cutter assembly may be employed to chamfer or provide a radius or other desired configuration to the corner of a work piece 60 by the simple expedient of positioning the assembly on the work piece with the guide surfaces 57 and 58 in full line contact therewith and then by moving the cutter assembly along the corner. The guiding surface 57 is formed on the outer race 34 which is freely rotatable, and the shell 42, upon which the guiding surface 58 is formed, is likewise rotatable independently of shaft 10 and may desirably also be rotatable with respect to the outer race 22 upon which it is mounted.

Figure 3:
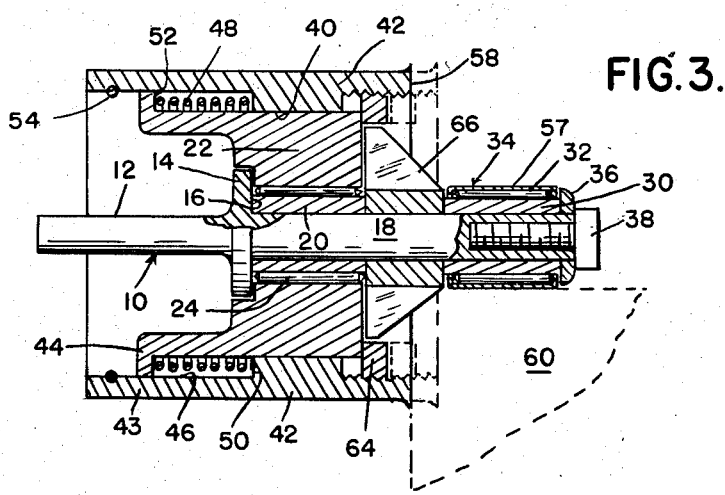
Figure 3 is a view similar to Figure 1 but showing a modified form of construction.

In the retracted position of shell 22 shown in full lines in Figure 1, it will be seen that the cutter 26 is completely exposed. There may be instances in which only a portion of the cutter is desired to be exposed in order to obtain a desired corner configuration. This is apt to be more likely to be the case where the cutter is provided with bevel forming blades as illustrated in the modification of Figure 3, although not necessarily so. In accordance with the invention as shown in Figure 3, the stop for determimning the retracted position of shell 42 is in the form of an annular ring 64 which is threadedly engaged with the inner surface of the shell adjacent the outer end of the latter for axial adjustment. Thus, the degree of retraction permitted of shell 42 is determined by the position of adjustment of the ring 64. It will be apparent that were ring 64 adjusted in an outward direction from that shown, a greater degree of retraction would be permitted of the shell, thereby exposing a greater portion of the cutter 66 and permitting a different corner configuration to be obtained.

In other respects, the cutter shown in Figure 3 is like that shown in Figures 1 and 2 and accordingly the same reference characters are employed.

It will be understood that the cutters 26 and 66 may be replaced by the simple expedient of removing the nut 38 and cap member 36, after which the outer bearing may be slipped off the shaft. It will also be understood that a bevel forming cutter element, such as that shown at 66, may be used in connection with the cutter illustrated in Figure 1, and that the cutter element 26 is intended for use also in the cutter of Figure 3. In general, any number of different cutter shapes may be employed, depending upon the corner configuration desired.

It will be understood that the cutter may be employed in one of two ways. In the first place, the shaft 12 may be engaged in the chuck in a suitable hand tool and the cutter assembly supported and moved into engagement with the work by suitable manipulation of the hand tool. Alternatively, suitable drive means may be connected to the shaft 12 and the operator may grip the shell 42, employing this shell as a handle to move the cutter along the corner to be chamfered.

The drawing and the foregoing specification constitute a description of the improved radius and chamfer cutter assembly in such full, clear, concise and exact terms as to enable any person skilled in the art to practice the invention, the scope of which is indicated by the appended claims.

What I claim as my invention is:

1. A radius and chamfer cutter comprising a shaft having its inner end shaped to be received in a hand power tool and provided adjacent its inner end with an outwardly facing shoulder, an axial inner bearing having its inner race abutting said shoulder, a cutter carried by said shaft and abutting the outer end of the inner race of said inner bearing, an axial outer bearing having its inner race abutting the outer end of said cutter, means releasably secured to the outer end of said shaft abutting the inner race of said outer bearing and locking said inner races and cutter to said shaft by pressure between said means and said shoulder, said bearings including outer races, a guide provided on the outer race of said outer bearing having a cylindrical guiding surface concentric with said shaft, a second guide comprising a cylindrical shell carried by the outer race of the inner bearing and having an internal diameter greater than the diameter of said cutter, said shell being slidable axially of said shaft between an outer limiting position in which the outer end of said shell completely receives and surrounds said cutter to protect the latter when not in use and an inner limiting position in which said cutter is exposed by said shell for use, the outer end of said shell lying entirely in a plane perpendicular to the axis of said shaft and constituting a guiding surface, stops for determining said positions, the stop for determining the inner limiting position of said shell being adjustable axially of said shaft to vary the portion of the cutter to be exposed, and a spring urging said shell to its outer limiting position.

2. A radius and chamfer cutter as defined in claim 1, in which the stop for determining the inner limiting position is a ring threaded on the inner surface of the shell adjacent the outer end thereof and engageable with the outer race of the inner bearing.

3. A radius and chamfer cutter comprising a shaft having its inner end adapted to be received in a power tool, a cylindrical guide coaxial with and carried by said shaft at the outer end thereof for rotation about the axis of said shaft, said guide having a cylindrical guiding surface concentric with said shaft, a cutter carried by said shaft inwardly of said guide, a second guide comprising a cylindrical shell coaxial with and carried by said shaft inwardly of said cutter for rotation about the axis of said shaft, said shell having an internal diameter greater than the diameter of said cutter, said shell being slidable axially of said shaft between an outer limiting position in which the outer end of said shell completely receives and surrounds said cutter to protect the latter when not in use and an inner limiting position in which said cutter is exposed by said shell for use, the outer end of said shell lying entirely in a plane perpendicular to the axis of said shaft and constituting a guiding surface, stops for determining said positions, the stop for determining the inner limiting position of said shell being adjustable axially of said shaft to vary the portion of the cutter to be exposed, and spring means urging said shell to its outer limiting position.

References Cited in the file of this patent

UNITED STATES PATENTS

| 1,115,348 | Taylor | Oct. 27, 1914 |
| 1,193,676 | Emerson | Aug. 8, 1916 |
| 2,276,470 | Dodelin | Mar. 17, 1942 |
| 2,395,751 | Newcomer et al. | Feb. 26, 1946 |
| 2,402,353 | Trautmann | June 18, 1946 |
| 2,740,330 | Watson | Apr. 3, 1956 |

FOREIGN PATENTS

| 554,111 | Great Britain | June 21, 1943 |
| 735,120 | Germany | May 6, 1943 |